(12) United States Patent
de Mersseman

(10) Patent No.: US 11,732,858 B2
(45) Date of Patent: Aug. 22, 2023

(54) HEADLIGHT ILLUMINATION SYSTEM USING OPTICAL ELEMENT

(71) Applicant: Veoneer US, LLC, Southfield, MI (US)

(72) Inventor: Bernard de Mersseman, Andover, MA (US)

(73) Assignee: Veoneer US, LLC, Southfield, MI (US)

( * ) Notice: Subject to any disclaimer, the term of this patent is extended or adjusted under 35 U.S.C. 154(b) by 32 days.

(21) Appl. No.: 17/351,313

(22) Filed: Jun. 18, 2021

(65) Prior Publication Data
US 2022/0403998 A1 Dec. 22, 2022

(51) Int. Cl.
*F21S 41/63* (2018.01)
*F21S 41/32* (2018.01)
*F21S 41/25* (2018.01)

(52) U.S. Cl.
CPC ............. *F21S 41/635* (2018.01); *F21S 41/25* (2018.01); *F21S 41/32* (2018.01)

(58) Field of Classification Search
None
See application file for complete search history.

(56) References Cited

U.S. PATENT DOCUMENTS

| | | |
|---|---|---|
| 1,520,245 A | 12/1924 | Humbrecht |
| 3,712,985 A | 1/1973 | Swarner et al. |
| 3,898,656 A | 8/1975 | Jensen |
| 4,125,864 A | 11/1978 | Aughton |
| 4,184,154 A | 1/1980 | Albanese et al. |
| 4,362,361 A | 12/1982 | Campbell et al. |
| 4,439,766 A | 3/1984 | Kobayashi et al. |
| 4,765,715 A | 8/1988 | Matsudaira et al. |
| 4,957,362 A | 9/1990 | Peterson |
| 5,200,606 A | 4/1993 | Krasutsky et al. |
| 5,210,586 A | 5/1993 | Grage et al. |
| 5,274,379 A | 12/1993 | Carbonneau et al. |

(Continued)

FOREIGN PATENT DOCUMENTS

| | | |
|---|---|---|
| AT | 509180 B1 | 1/2016 |
| DE | 19757840 C1 | 9/1999 |

(Continued)

OTHER PUBLICATIONS

Kasturi et al., UAV-Borne LiDAR with MEMS Mirror Based Scanning Capability; SPIE Defense and Commercial Sensing Conference 2016, Baltimore, MD; 10 pages, 2016.

(Continued)

*Primary Examiner* — Elmito Breval
(74) *Attorney, Agent, or Firm* — Burns & Levinson LLP; Steven M. Mills

(57) ABSTRACT

An illumination system for a vehicle includes a headlight configured to emit a light beam along an optical path and into an environment. The illumination system includes an optical element having a body comprising four sides. The optical element is positioned along the optical path and configured to redirect the light beam. The illumination system includes a front lens positioned along the optical path and configured to receive the light beam from the optical element and collimate the light beam as the light beam passes into the environment. The optical element is configured to move around an optical element axis to translate the light beam relative to an azimuth plane of the environment.

17 Claims, 9 Drawing Sheets

(56) References Cited

U.S. PATENT DOCUMENTS

| | | |
|---|---|---|
| 5,428,215 A | 6/1995 | Dubois et al. |
| 5,604,695 A | 2/1997 | Cantin et al. |
| 5,793,491 A | 8/1998 | Wangler et al. |
| 5,889,490 A | 3/1999 | Wachter et al. |
| 5,966,226 A | 10/1999 | Gerber |
| 6,078,395 A | 6/2000 | Jourdain et al. |
| 6,122,222 A | 9/2000 | Hossack |
| 6,292,285 B1 | 9/2001 | Wang |
| 6,384,770 B1 | 5/2002 | de Gouy |
| 6,437,854 B2 | 8/2002 | Hahlweg |
| 6,556,282 B2 | 4/2003 | Jamieson et al. |
| 6,559,932 B1 | 5/2003 | Halmos |
| 7,202,941 B2 | 4/2007 | Munro |
| 7,227,116 B2 | 6/2007 | Gleckler |
| 7,272,271 B2 | 9/2007 | Kaplan et al. |
| 7,440,084 B2 | 10/2008 | Kane |
| 7,483,600 B2 | 1/2009 | Achiam et al. |
| 7,489,865 B2 | 2/2009 | Varshneya et al. |
| 7,544,945 B2 | 6/2009 | Tan et al. |
| 7,570,347 B2 | 8/2009 | Ruff et al. |
| 7,675,610 B2 | 3/2010 | Redman et al. |
| 7,832,762 B2 | 11/2010 | Breed |
| 8,044,999 B2 | 10/2011 | Mullen et al. |
| 8,050,863 B2 | 11/2011 | Trepagnier et al. |
| 8,134,637 B2 | 3/2012 | Rossbach et al. |
| 8,223,215 B2 | 7/2012 | Oggier et al. |
| 8,363,511 B2 | 1/2013 | Frank et al. |
| 8,508,723 B2 | 8/2013 | Chang et al. |
| 8,629,975 B1 | 1/2014 | Dierking et al. |
| 8,742,325 B1 | 6/2014 | Droz et al. |
| 8,836,761 B2 | 9/2014 | Wang et al. |
| 8,836,922 B1 | 9/2014 | Pennecot et al. |
| 8,879,050 B2 | 11/2014 | Ko |
| 9,007,569 B2 | 4/2015 | Amzajerdian et al. |
| 9,063,549 B1 | 6/2015 | Pennecot et al. |
| 9,086,273 B1 | 7/2015 | Gruver et al. |
| 9,090,213 B2 | 7/2015 | Lawlor et al. |
| 9,097,646 B1 | 8/2015 | Campbell et al. |
| 9,140,792 B2 | 9/2015 | Zeng |
| 9,157,790 B2 | 10/2015 | Shpunt et al. |
| 9,267,787 B2 | 2/2016 | Shpunt et al. |
| 9,285,477 B1 | 3/2016 | Smith et al. |
| 9,575,162 B2 | 2/2017 | Owechko |
| 9,618,742 B1 | 4/2017 | Droz et al. |
| 9,651,417 B2 | 5/2017 | Shpunt et al. |
| 9,658,322 B2 | 5/2017 | Lewis |
| 9,696,427 B2 | 7/2017 | Wilson et al. |
| 9,711,493 B2 | 7/2017 | Lin |
| 9,753,351 B2 | 9/2017 | Eldada |
| 9,823,351 B2 | 11/2017 | Haslim et al. |
| 9,857,472 B2 | 1/2018 | Mheen et al. |
| 9,869,754 B1 | 1/2018 | Campbell et al. |
| 10,018,725 B2 | 7/2018 | Liu |
| 10,018,726 B2 | 7/2018 | Hall et al. |
| 10,024,655 B2 | 7/2018 | Raguin et al. |
| 10,078,133 B2 | 9/2018 | Dussan |
| 10,088,557 B2 | 10/2018 | Yeun |
| 10,148,060 B2 | 12/2018 | Hong et al. |
| 10,175,360 B2 | 1/2019 | Zweigle et al. |
| 10,183,541 B2 | 1/2019 | Van Den Bossche et al. |
| 10,408,924 B2 | 9/2019 | Mheen |
| 10,411,524 B2 | 9/2019 | Widmer et al. |
| 10,416,292 B2 | 9/2019 | de Mersseman et al. |
| 10,473,767 B2 | 11/2019 | Xiang et al. |
| 10,473,784 B2 | 11/2019 | Puglia |
| 10,473,943 B1 | 11/2019 | Hughes |
| 10,551,501 B1 | 2/2020 | LaChapelle |
| 10,557,923 B2 | 2/2020 | Watnik et al. |
| 10,558,044 B2 | 2/2020 | Pan |
| 10,564,268 B2 | 2/2020 | Furbide et al. |
| 10,578,724 B2 | 3/2020 | Droz et al. |
| 10,627,493 B2 | 4/2020 | Morikawa |
| 10,678,117 B2 | 6/2020 | Shin et al. |
| 10,775,508 B1 | 9/2020 | Rezk et al. |
| 10,937,773 B2 | 3/2021 | T'Ng |
| 2001/0052872 A1 | 12/2001 | Hahlweg |
| 2003/0043363 A1 | 3/2003 | Jamieson et al. |
| 2004/0028418 A1 | 2/2004 | Kaplan et al. |
| 2004/0031906 A1 | 2/2004 | Glecker |
| 2004/0135992 A1 | 7/2004 | Munro |
| 2004/0155249 A1 | 8/2004 | Narui et al. |
| 2005/0219506 A1 | 10/2005 | Okuda et al. |
| 2006/0221250 A1 | 10/2006 | Rossbach et al. |
| 2006/0232052 A1 | 10/2006 | Breed |
| 2006/0239312 A1 | 10/2006 | Kewitsch et al. |
| 2007/0140613 A1 | 6/2007 | Achiam et al. |
| 2007/0181810 A1 | 8/2007 | Tan et al. |
| 2007/0211786 A1 | 9/2007 | Shatill |
| 2007/0219720 A1 | 9/2007 | Trepagnier et al. |
| 2008/0088499 A1 | 4/2008 | Bonthron et al. |
| 2008/0095121 A1 | 4/2008 | Shatill |
| 2008/0100510 A1 | 5/2008 | Bonthron |
| 2008/0219584 A1 | 9/2008 | Mullen et al. |
| 2008/0246944 A1 | 10/2008 | Redman et al. |
| 2009/0002680 A1 | 1/2009 | Ruff et al. |
| 2009/0010644 A1 | 1/2009 | Varshneya et al. |
| 2009/0190007 A1 | 7/2009 | Oggier et al. |
| 2009/0251361 A1 | 10/2009 | Bensley |
| 2010/0027602 A1 | 2/2010 | Abshire et al. |
| 2010/0128109 A1 | 5/2010 | Banks |
| 2010/0157280 A1 | 6/2010 | Kusevic et al. |
| 2010/0182874 A1 | 7/2010 | Frank et al. |
| 2012/0075422 A1 | 3/2012 | Wang et al. |
| 2012/0182540 A1 | 7/2012 | Suzuki |
| 2012/0206712 A1 | 8/2012 | Chang et al. |
| 2012/0236379 A1 | 9/2012 | da Silva et al. |
| 2012/0310516 A1 | 12/2012 | Zeng |
| 2012/0310519 A1 | 12/2012 | Lawlor et al. |
| 2013/0088726 A1 | 4/2013 | Goyal et al. |
| 2013/0093584 A1 | 4/2013 | Schumacher |
| 2013/0120760 A1 | 5/2013 | Raguin et al. |
| 2013/0166113 A1 | 6/2013 | Dakin et al. |
| 2013/0206967 A1 | 8/2013 | Shpunt et al. |
| 2013/0207970 A1 | 8/2013 | Shpunt et al. |
| 2013/0222786 A1 | 8/2013 | Hanson et al. |
| 2013/0250276 A1 | 9/2013 | Chang et al. |
| 2014/0036252 A1 | 2/2014 | Amzajerdian et al. |
| 2014/0049609 A1 | 2/2014 | Wilson et al. |
| 2014/0152975 A1 | 6/2014 | Ko |
| 2014/0168631 A1* | 6/2014 | Haslim .................. G02B 6/262 356/4.01 |
| 2014/0233942 A1 | 8/2014 | Kanter |
| 2014/0313519 A1 | 10/2014 | Shpunt et al. |
| 2015/0009485 A1 | 1/2015 | Mheen et al. |
| 2015/0055117 A1 | 2/2015 | Pennecot et al. |
| 2015/0234308 A1 | 8/2015 | Lim et al. |
| 2015/0260843 A1 | 9/2015 | Lewis |
| 2015/0301162 A1 | 10/2015 | Kim |
| 2015/0371074 A1 | 12/2015 | Lin |
| 2015/0378011 A1 | 12/2015 | Owechko |
| 2016/0047895 A1 | 2/2016 | Dussan |
| 2016/0047896 A1 | 2/2016 | Dussan |
| 2016/0047903 A1 | 2/2016 | Dussan |
| 2016/0138944 A1 | 5/2016 | Lee et al. |
| 2016/0178749 A1 | 6/2016 | Lin et al. |
| 2016/0200161 A1 | 7/2016 | Van Den Bossche et al. |
| 2016/0245902 A1 | 8/2016 | Watnik et al. |
| 2016/0280229 A1 | 9/2016 | Kasahara |
| 2016/0291160 A1 | 10/2016 | Zweigle et al. |
| 2016/0357187 A1 | 12/2016 | Ansari |
| 2016/0363669 A1 | 12/2016 | Liu |
| 2016/0380488 A1 | 12/2016 | Widmer et al. |
| 2017/0023678 A1 | 1/2017 | Pink et al. |
| 2017/0090013 A1 | 3/2017 | Paradie et al. |
| 2017/0102457 A1 | 4/2017 | Li |
| 2017/0199273 A1 | 7/2017 | Morikawa et al. |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0310948 A1 | 10/2017 | Pei |
| 2017/0329010 A1 | 11/2017 | Warke et al. |

(56) References Cited

U.S. PATENT DOCUMENTS

| | | |
|---|---|---|
| 2017/0329011 A1 | 11/2017 | Warke et al. |
| 2018/0052378 A1 | 2/2018 | Shin et al. |
| 2018/0113193 A1 | 4/2018 | Huemer |
| 2018/0128903 A1 | 5/2018 | Chang |
| 2018/0136328 A1 | 5/2018 | Moss |
| 2018/0143309 A1 | 5/2018 | Pennecot et al. |
| 2018/0180718 A1 | 6/2018 | Lin |
| 2018/0224529 A1 | 8/2018 | Wolf et al. |
| 2018/0241477 A1 | 8/2018 | Turbide et al. |
| 2018/0275249 A1 | 9/2018 | Campbell et al. |
| 2018/0275275 A1 | 9/2018 | Lundquist |
| 2018/0284237 A1 | 10/2018 | Campbell |
| 2018/0284282 A1 | 10/2018 | Hong et al. |
| 2018/0284286 A1 | 10/2018 | Eichenholz |
| 2018/0286909 A1 | 10/2018 | Eichenholz et al. |
| 2018/0306913 A1 | 10/2018 | Bartels |
| 2018/0341009 A1 | 11/2018 | Niclass et al. |
| 2018/0364334 A1 | 12/2018 | Xiang et al. |
| 2018/0372870 A1 | 12/2018 | Puglia |
| 2019/0018143 A1 | 1/2019 | Thayer et al. |
| 2019/0101644 A1 | 4/2019 | DeMersseman et al. |
| 2019/0123508 A1 | 4/2019 | Hong et al. |
| 2019/0129009 A1 | 5/2019 | Eichenholz et al. |
| 2019/0139951 A1 | 5/2019 | T'Ng et al. |
| 2019/0146060 A1 | 5/2019 | Qiu et al. |
| 2019/0195990 A1 | 6/2019 | Shand |
| 2019/0221988 A1* | 7/2019 | Villeneuve ............ G01S 7/4804 |
| 2019/0235064 A1 | 8/2019 | Droz et al. |
| 2019/0242978 A1* | 8/2019 | Weed .................... G01S 7/4817 |
| 2019/0265336 A1 | 8/2019 | Zhang et al. |
| 2019/0310351 A1 | 10/2019 | Hughes et al. |
| 2020/0081129 A1 | 3/2020 | de Mersseman et al. |
| 2020/0088847 A1 | 3/2020 | DeMersseman et al. |
| 2020/0249354 A1 | 8/2020 | Yeruhami et al. |
| 2020/0284906 A1 | 8/2020 | Bulpin |
| 2020/0341120 A1 | 10/2020 | Ahn |
| 2020/0341121 A1 | 10/2020 | Ahn |
| 2021/0018602 A1 | 1/2021 | de Mersseman et al. |

FOREIGN PATENT DOCUMENTS

| | | |
|---|---|---|
| DE | 102004033944 A | 2/2006 |
| DE | 102006031114 B4 | 7/2008 |
| DE | 102008045387 A1 | 3/2010 |
| DE | 102014218957 A1 | 3/2016 |
| DE | 102015217908 A1 | 3/2017 |
| EP | 0112188 B1 | 6/1987 |
| EP | 0578129 A2 | 1/1994 |
| EP | 2124069 A1 | 11/2009 |
| EP | 2696166 A3 | 12/2014 |
| EP | 2824418 A1 | 1/2015 |
| EP | 3203259 A1 | 8/2017 |
| EP | 3457080 A1 | 3/2019 |
| EP | 3147685 B1 | 1/2020 |
| KR | 20190105889 A | 9/2019 |
| WO | 1994019705 A1 | 9/1994 |
| WO | 2008008970 A3 | 1/2008 |
| WO | 2015014556 A3 | 2/2015 |
| WO | 2016072483 A1 | 5/2016 |
| WO | 2016097409 A3 | 6/2016 |
| WO | 2016204139 A1 | 12/2016 |
| WO | 2019050643 A1 | 3/2019 |
| WO | 2019099166 A1 | 5/2019 |

OTHER PUBLICATIONS

Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_lasersensors_in_self-driving_carsjsp.
Hewlett-Packard Application Note 77-4, Swept-Frequency Group Delay Measurements, Hewlett-Packard Co., Sep., 7 pages, 1968.
Kravitz et al., High-Resolution Low-Sidelobe Laser Ranging Based on Incoherent Pulse Compression, IEEE Jhotonic,s Technology Letters, vol. 24, No. 23, pp. 2119-2121, 2012.
Journet et al., A Low-Cost Laser Range Finder Based on an FMCW-like Method, IEEE Transactions on instrumentation and Measurement, vol. 49, No. 4, pp. 840-843, 2000.
Campbell et al., Advanced Sine Wave Modulation of Continuous Wave Laser System for Atmospheric CO2 Differential Absorption Measurements; NASA Langley Research Center, 32 pages, 2018.
Levanon et al., Non-coherent Pulse Compression-Aperiodic and Periodic Waveforms; The Institution of Engineering and Technology, 9 pages, 2015.
Peer et al., Compression Waveforms for Non-Coherent Radar, Tel Aviv University, 6 pages, 2018.
Li, Time-of-Flight Camera—An Introduction, Technical White Paper, SLOA190B, Texas Instruments, 10 pages, 2014.
Pierrottet et al., Linear FMCW Laser Radar for Precision Range and Vector Velocity Measurements, Coherent Applications, Inc., NASA Langley Research Center, 9 pages, 2018.
Kahn, Modulation and Detection Techniques for Optical Communication Systems, Stanford University, Department of Electrical Engineering, 3 pages, 2006.
Niclass et al., Development of Automotive LIDAR, Electronics and Communications in Japan, vol. 98, No. 5, 6 pages, 2015.
Su et al., 2-D FFT and Time-Frequency Analysis Techniques for Multi-Target Recognition of FMCW Radar Signal, Proceedings of the Asia-Pacific Microwave Conference 2011, pp. 1390-1393.
Wojtkiewicz et al., Two-Dimensional Signal Processing in FMCW Radars, Instytut Podstaw Elektroniki Politechnika Narszawska, Warszawa, 6 pages, 2018.
Winkler, Range Doppler Detection for Automotive FMCW Radars, Proceedings of the 4th European Radar Conference, Munich Germany, 4 pages, 2007.
Li et al., Investigation of Beam Steering Performances in Rotation Risley-Prism Scanner, Optics Express, vol. 24, No. 12, 11 pages, 2016.
THORLABS Application Note, Risley Prism Scanner, 33 pages, 2018.
Simpson et al., Intensity-Modulated, Stepped Frequency CW Lidar for Distributed Aerosol and Hard Target Measurements, Applied Optics, vol. 44, No. 33, pp. 7210-7217, 2005.
Skolnik, Introduction to Radar Systems, 3rd Edition, McGraw-Hill, New York, NY 2001, pp. 45-48.
Wang et al., Range-Doppler image processing in linear FMCW Radar and FPGA Based Real-Time Implementation, Journal of Communication and Computer, vol. 6, No. 4, 2009.
International Search Report and Written Opinion for International Application No. PCT/US2018/057727 dated Jan. 28, 2019.
International Search Report and Written Opinion for International Application No. PCT/US2018/052837 dated Jan. 24, 2019.
International Search Report and Written Opinion for International Application No. PCT/US2017/033263 dated Aug. 29, 2017.
International Search Report and Written Opinion for International Application No. PCT/US2018/048869 dated Nov. 8, 2018.
International Search Report and Written Opinion for International Application No. PCT/US2018/051281 dated Nov. 22, 2018.
International Search Report and Written Opinion for International Application No. PCT/US2018/054992 dated Dec. 11, 2018.
International Search Report and Written Opinion for International Application No. PCT/US2018/049038 dated Dec. 12, 2018.

(56) References Cited

OTHER PUBLICATIONS

International Search Report and Written Opinion for International Application No. PCT/US2017/033265 dated Sep. 1, 2017.
International Search Report and Written Opinion for International Application No. PCT/US2017/033271 dated Sep. 1, 2017.
Invitation to Pay Additional Fees for International Application No. PCT/US2018/052849 dated Mar. 8, 2019.
http://www.advancedscientificconcepts.com/products/overview.html.
Roncat, Andreas, The Geometry of Airborne Laser Scanning in a Kinematical Framework, Oct. 19, 2016, www.researchgate.net/profile/Andreas_Roncat/publication/310843362_The_Geometry_of_Airborne_LaserScanningin_a_Kinematical_Frameworldinks/5839add708ae3a74b49ea03b1The-Geometry-of-Airbome-Laser-Scanning-in-a-Kinematical-Framework.pdf.
International Search Report and Written Opinion for International Application No. PCT/US2020/039760, dated Sep. 18, 2020.
Church et al., "Evaluation of a steerable 3D laser scanner using a double Risley prism pair," SPIE Paper.
Luhmann, "A historical review on panorama photogrammetry," http://www.researchgate.net/publication/228766550.
International Search Report and Written Opinion for International Application No. PCT/US2020/064474, dated Apr. 1, 2021.
International Search Report and Written Opinion for International Application No. PCT/US2018/057676, dated Jan. 23, 2019.
International Search Report and Written Opinion for International Application No. PCT/US2018/052849, dated May 3, 2019.
International Search Report and Written Opinion for International Application No. PCT/US2019/046800, dated Nov. 25, 2019.
Communication from EP Application No. 18773034.6 dated Sep. 13, 2021.

\* cited by examiner

HEADLIGHT ILLUMINATION SYSTEM USING OPTICAL ELEMENT

FIELD OF THE TECHNOLOGY

The subject disclosure relates to illumination systems and more particularly to headlights for vehicles.

BACKGROUND OF THE TECHNOLOGY

Vehicles use illumination systems, such as headlights, to project a beam or several beams of light into an environment to brighten a path of travel for a driver. In this regard, automotive illumination systems are installed on the front and rear of vehicles to help drivers identify potential hazards in their path of travel during low light conditions. Though, where a travel direction, elevation, or speed shift suddenly, conventional, static illumination systems may not fully project on and illuminate the path of travel. Accordingly, adaptive headlight for cars are of increasing demands.

SUMMARY OF THE TECHNOLOGY

In at least one aspect, this application describes an exemplary use of an illumination system for a vehicle using an optical element configured to move around an optical element axis to change a direction a light beam is transmitted relative to an azimuth plane of the environment.

An example illumination system for a vehicle includes a headlight configured to emit a light beam along an optical path and into an environment. The illumination system includes an optical element having a body comprising four sides. The optical element is positioned along the optical path and configured to redirect the light beam. The illumination system includes a front lens positioned along the optical path and configured to receive the light beam from the optical element and collimate the light beam as the light beam passes into the environment. The optical element is configured to move around an optical element axis to change a direction the light beam is transmitted relative to an azimuth plane of the environment.

The rotational position of the optical element around the optical element axis and a position of the front lens along the optical path may determine a direction of the light beam in the azimuth plane.

The illumination system may include a relay lens positioned along the optical path between the headlight and the optical element. The relay lens is configured to receive the light beam from the headlight and collimate the light beam. The illumination system may include a curved mirror positioned along the optical path, The curved mirror includes an inner reflective surface configured to reflect the light beam from the headlight and towards the optical element. The curved mirror also includes a lens positioned along the inner reflective surface to converge the light beam to a focal plane.

The illumination system may include a detection system to determine attributes of the environment.

The headlight may include a high irradiance white light source. The headlight may have an emitting area of less than 0.5 square millimeters.

An example vehicle headlight includes a headlight housing having a transmissive side. The vehicle headlight includes a light source positioned within the headlight housing. The light source is configured to emit a light beam along an optical path and into an environment. The vehicle headlight includes an optical element positioned within the headlight housing between the light source and the transmissive side. The optical element is positioned along the optical path. The optical element has a body comprising four sides. The vehicle headlight includes a front lens positioned within the headlight housing between the optical element and the transmissive side. The front lens is positioned along the optical path. The front lens is configured to receive the light beam from the optical element and collimate the light beam as the light beam passes through the transmissive side of the headlight housing and into an environment. The optical element is configured to move around an optical element axis to change a direction the light beam is transmitted relative to an azimuth plane of the environment.

A rotational position of the optical element around the optical element axis and a position of the front lens along the optical path determines a direction of the light beam in the azimuth plane.

The vehicle headlight may include a relay lens positioned along the optical path between the light source and the optical element. The relay lens is configured to receive the light beam from the light source and collimate the light beam. The vehicle headlight may include a curved mirror positioned along the optical path. The curved mirror includes an inner reflective surface configured to reflect the light beam from the headlight and towards the optical element. The curved mirror also includes a lens positioned along the inner reflective surface to converge the light beam to a focal plane.

The vehicle headlight may include a detection system to determine attributes of the environment.

The light source may include a high irradiance white light source. The light source may have an emitting area of less than 0.5 square millimeters.

An example method of illuminating an environment with an illumination system on a vehicle includes emitting light, with a headlight of the illumination system, along an optical path and into an environment. The method includes receiving the light with an optical element, the optical element having a body comprising four sides. The method includes actuating the optical element around an optical element axis to change a direction a light beam is transmitted from the optical element relative to an azimuth plane of the environment. The method includes collimating, with a front lens of the illumination system, the light from the optical element.

A rotational position of the optical element around the optical element axis and a position of the front lens along the optical path may determine a direction of the light beam in the azimuth plane.

The method may include collimating the light with a lens before receiving the light with the optical element. The method may include converging the light before receiving the light with the optical element with a curved mirror positioned along the optical path. The curved mirror includes an inner reflective surface configured to reflect the light beam from the headlight and towards the optical element. The curved mirror also includes a lens positioned along the inner reflective surface to converge the light beam to a focal plane.

The headlight may include a high irradiance white light source. The headlight may have an emitting area of less than 0.5 square millimeters.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
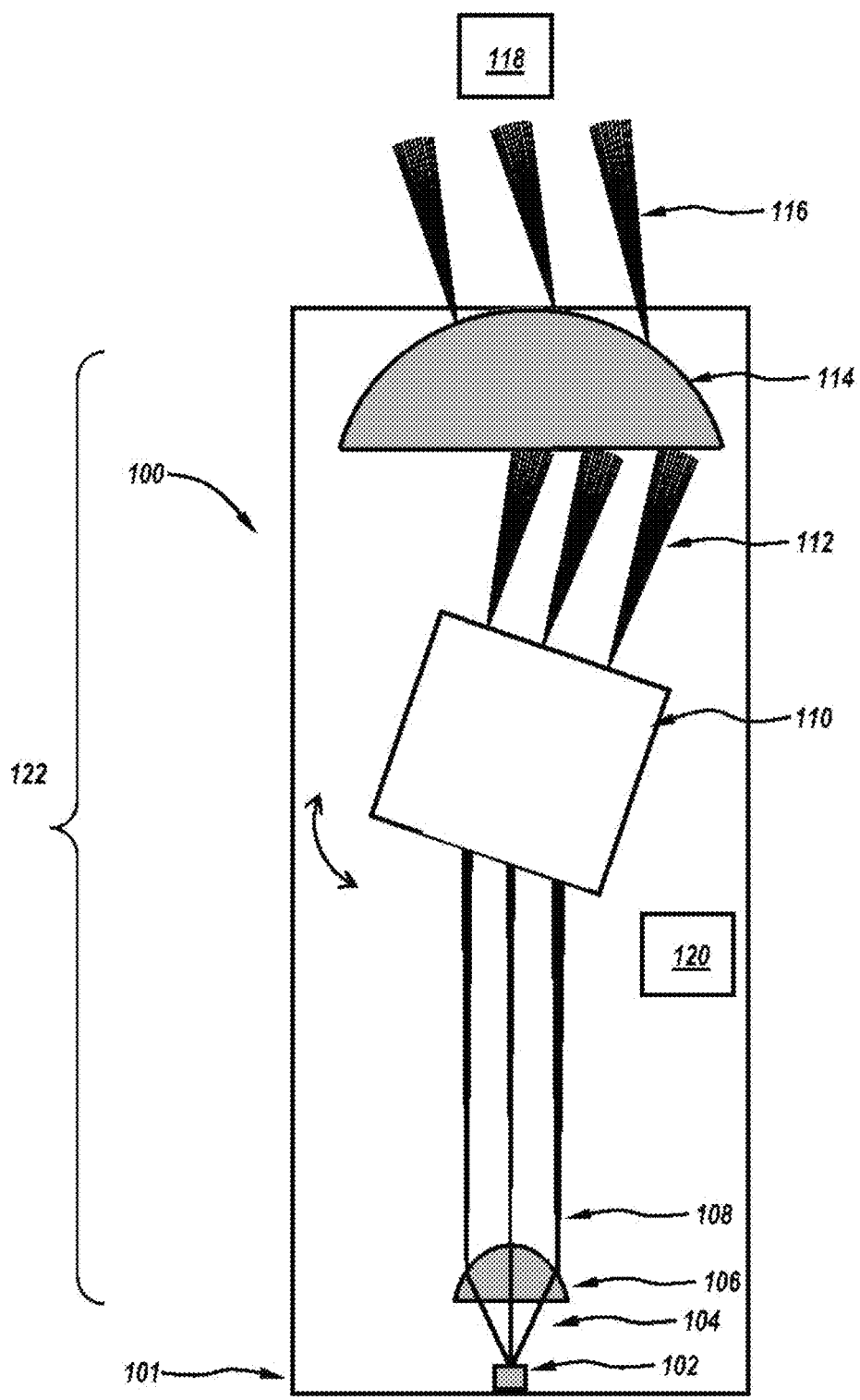
FIG. 1 is an overhead schematic diagram of an example illumination system for a vehicle in accordance with the subject technology.

The subject technology overcomes many of the prior art problems associated with vehicle illumination systems. In brief summary, the subject technology provides an illumination system utilizing an optical element for redirecting light. The advantages, and other features of the systems and methods disclosed herein, will become more readily apparent to those having ordinary skill in the art from the following detailed description of certain preferred embodiments taken in conjunction with the drawings which set forth representative embodiments of the subject technology. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be vertically above).

Referring now to FIG. 1, an illumination system 100 for a vehicle in accordance with the subject technology is shown. The illumination system 100 can be mounted on or within a vehicle requiring illumination (not distinctly shown), such as a car, truck, locomotive, drone, boat, robot, or like vessel. The illumination system 100 includes a housing 101 containing optical components of the system 100. The housing 101 may be a structural support in some implementations. The illumination system 100 employs a headlight 102 configured to emit a light 104 along an optical path 122. When activated, the illumination system 100 is designed to undergo an illumination event, illuminating the surrounding environment 118 with light from the headlight 102. The environment 118 is illuminated through automatic actuation of the illumination system 100 based on gathered data concerning the environment, described in further detail below.

The environment 118 may include a traveling surface, or a vehicle path of travel, such as: surface impediments; hazardous or nonhazardous articles thereon; curves or turns in the traveling surface; or markers such as crosswalks or lane dividing lines. The environment 118 may include other articles such as vehicles or signs, and retroreflective surfaces thereon such as a license plate, light modules, or traffic signs. Nonetheless, the environment 118 may include objects and characteristics not mentioned herein.

The headlight 102 can emit light 104 from a single light source (e.g. a single LED or laser source) or from multiple light sources arranged in a column, row, or array. In this regard, multiple sources may contribute along an azimuth plane (contribution of light along the "x-y" plane) or along a vertical direction (contribution of light along the "z" axis) to improve resolution or increase light coverage within the environment 118. As such, the headlight 102 may include, for example, a vertical array of high brightness white, color, or near infra-red LEDs. The headlight 102 may include an array of light sources collocated in or near an image plane of the headlight 102.

In some implementations, the headlight 102 may include a single or multiple white laser light sources, such as one or more superluminescent diodes, which provide for increased visibility and is noticeable even in daytime lighting. The headlight 102 may include a pure crystal of cerium doped yttrium aluminum garnet (Ce:YAG) for light conversion, enabling a small emitting area relative to in-glass or ceramic phosphor. In some implementations, the headlight 102 may have an emitting area less than 0.25 millimeters$^2$. In some implementations, the headlight 102 may have an emitting area less than 0.5 millimeters$^2$. A smaller emitting area provides for higher efficiency applications and smaller optics and form factor. The light from a Ce:YAG crystal may include a yellow coloring. In other implementations, a single or multiple infra-red laser headlights 102 may be used in order to provide active illumination to the system for night time operation and to avoid distracting or otherwise effecting the visibility of other drivers.

A relay lens 106 is positioned along an optical path 122 of the illumination system 100, between the headlight 102 and an optical element 110. The relay lens 106 includes a curved mirror or lens to collimate, converge, or diverge the emitted light 104 from the headlight 102. In this regard, the relay lens 106 may reduce the divergence or convergence of the light 104 or may align the light 104 along the "y" axis direction of the illumination system 100. As such, the relay lens 106 is positioned along the optical path 122 to collimate, converge, or diverge light 104 into one or more light beams 108 received by the optical element 110.

While the properties of the optical element 110 are discussed in greater detail below, during an illumination event, or when the headlight 102 is turned on, the optical element 110 is configured to move around an optical element axis to redirect the light beam 108 for illuminating the environment 118. The optical element 110 can be affixed to rotate centrally around the optical element axis, such as the "z" axis of illumination system 100, to direct the light beam 108 in the azimuth direction (i.e. changing field of view along the "x-y" plane). In this regard, the optical element 110 can continuously rotate in full, 360 degree rotations or can oscillate at a predetermined time or in accordance with a cycle. Movement of the optical element 110 can be accomplished by coupling it to an actuator, not distinctly shown in FIG. 1.

The optical element 110 translates, refracts, reflects, transmits, or otherwise allows the light beam 108 to propagate therethrough. The light beam 108 may travel through the optical element 110, such that light beam 112 is directed toward a front lens 114. In this regard, the light beam 112 may be translated by the optical element 110 relative to an optical axis of the front lens 114 or another point of reference. As such, the light beam 112 may be translated by the optical element 110 such that the light beam 112 is parallel to, orthogonal to, perpendicular to, or askew to the front lens 114.

The front lens 114 is positioned between the optical element 110 and the environment 118. The front lens 114 includes a curved mirror or lens. The front lens 114 collimates the light beam 112 from the optical element 110 such that a light beam 116 exiting the front lens 114 include parallel rays. For example, front lens 114 may reduce the divergence or convergence of the light beam 112 until the divergence or convergence is negligible. For example, front lens 114 may align the light beam 112 in a specific direction, such as the "y" axis direction of the illumination system 100.

In the arrangement shown, the headlight 102, relay lens 106, the optical element 110, and front lens 114 are arranged in a substantially straight line in the azimuth plane, that is, the "x-y" plane. In other implementations, headlight 102, relay lens 106, optical element 110, and front lens 114 may be positioned in an offset manner such as to reduce a length of the illumination system 100. In other implementations, one or more reflective lenses (not distinctly shown) may be employed such that headlight 102, relay lens 106, optical element 110, and the front lens 114 can be positioned indiscriminately within illumination system 100, in that the reflective lens direct the optical path 122 from the headlight 102, relay lens 106, optical element 110, and front lens 114.

The system 100 may also include a processing module 120, which can be a processor connected to memory and configured to carry out instructions, the processing module 120 being configured to control the optical element 110 based on the environment 118 and an operator's actions. In some implementations, processing module 120 can control the optical element 110 with proportionate actuation to direct the light beam 116 in a direction to illuminate the environment 118 relative to the vehicle's path of travel. For example, processing module 120 can control the optical element 110 with proportionate actuation to direct the light beam 116 when a vehicle operator steers a driver wheel toward a direction, the vehicle detects an acceleration or centrifugal force in a direction, or the car detects a shifted center of gravity or bumping along a traveling surface. The processing module 120 may also be configured to control oscillation of the optical element 110 at a predetermined cycle time.

Processing module 120 controls the headlight 102 intensity (current pulse) through software via a current source driver. In this regard, the intensity is adjusted in real time by the processing module 120. The current pulse adjusted depends on the position or angle of the light beam 104 relative the optical path 122 or depending on the environment 118.

Figure 2A:
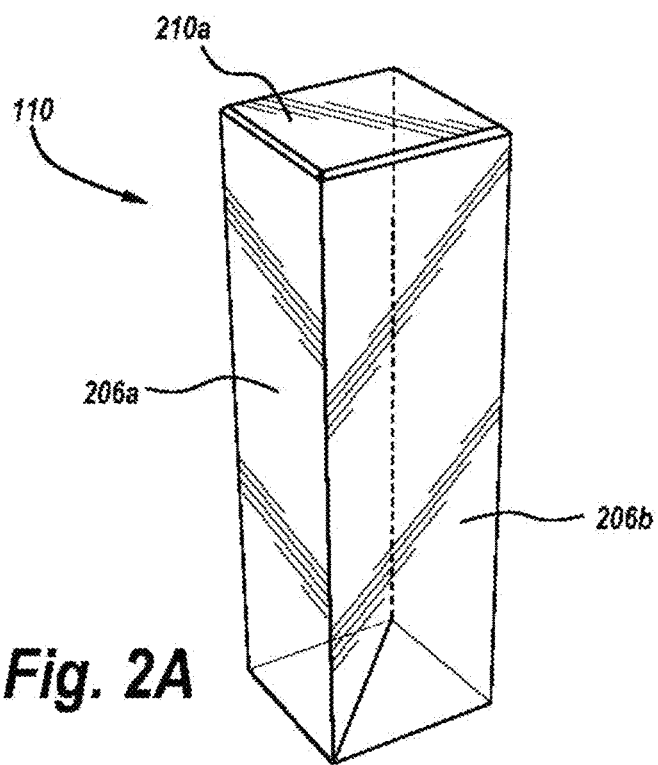
FIG. 2A is a front perspective view of an optical element component for the illumination system of FIG. 1.
Figure 2B:
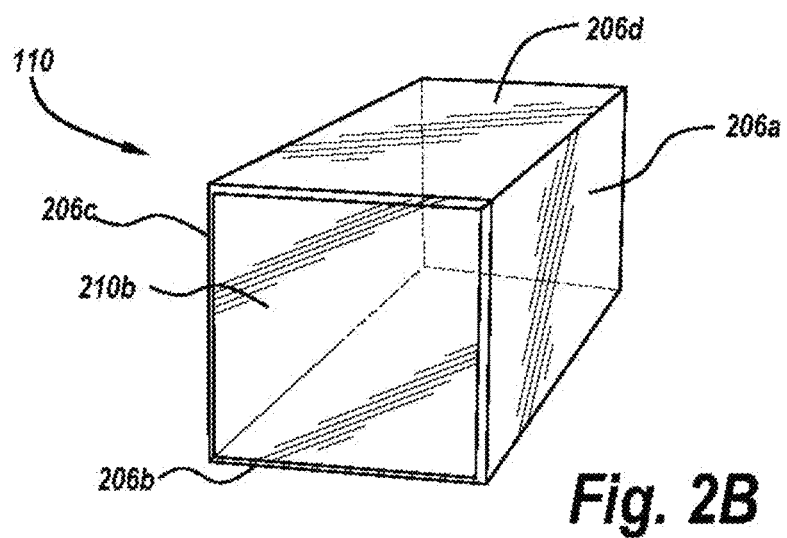
FIG. 2B is a bottom perspective view of the optical element of FIG. 2A.

Referring now to FIGS. 2A-2B, the details of the optical element 110 are shown and described in further detail. The optical element 110 has a body in the shape of a rectangular prism with an exterior defined by four outer faces 206a, 206b, 206c, 206d (generally 206) forming the prism sides which extend between the faces 210a, 210b (generally 210) which form the prism ends. In general, the faces 206 sit at right angles to one another. The outer faces 206 are generally transmissive, allowing light to pass therethrough, and allowing light to pass through the body of the optical element 110, while redirection, refracting, or translating the light beam 108.

Note that while a four-sided prism is shown, the prism can include a different number of sides, such as 6, 8, etc., and still be used within the illumination system 100. In some implementations, the optical element 112 may define a polygonal prism, having fewer or more faces than 6, fewer or more edges than 12, or fewer or more vertices than 8.

The outer faces 206 may include glass material or an optical polymer such as polymethyl methacrylate, polycarbonate, polystyrene, liquid silicon or the like. In this regard, the optical element 110 may be made of a material having a refractive index varying from a medium surrounding the optical element 110. In some implementations, the optical element 110 is made of a solid piece of glass with a high refractive index. In some implementations, the refractive index N is greater than 1.5. As such, the light beam 108 may enter the optical element 110 at an entrance angle and may change speed upon entering the optical element 110 material due to the phase velocity of the light beam 108 in the optical element 110 material. The change in speed causes the light beam 108 to refract or translate and proceed through the optical element 110 at an exit angle, where the entrance and exit angle may differ. The degree of refraction or translation depends on the entrance angle of the light beam 108 and the refractive index of the optical element 110 material. As such, internal reflection of light beam 108 may occur at the faces 206, 210 of the optical element 110, described by Snell's law of refraction.

Figure 3A:
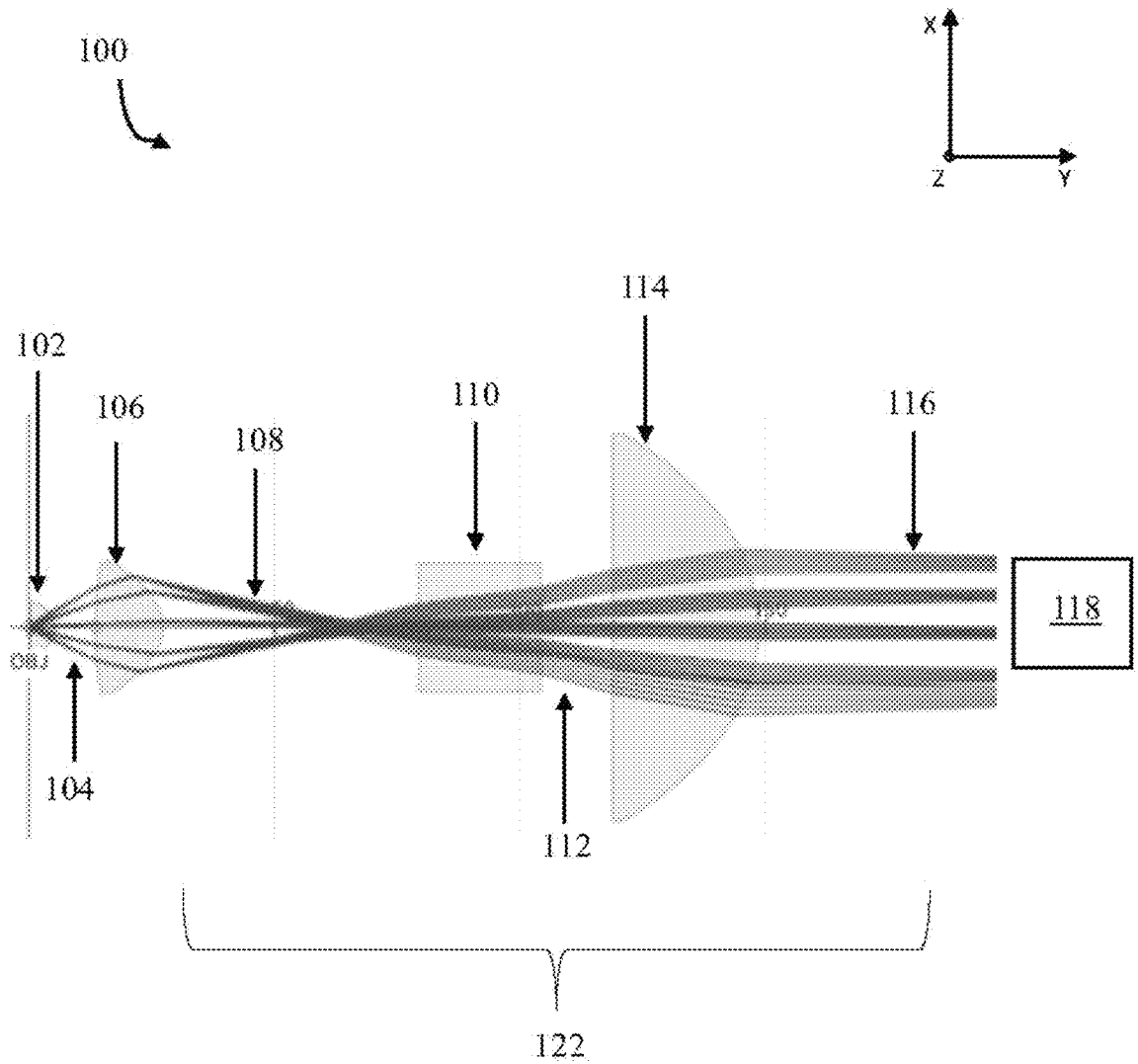
FIGS. 3A-3B, are overhead schematic diagrams of the illumination system of FIG. 1, showing optical element positions and corresponding optical paths of light in an azimuth plane.
Figure 3B:
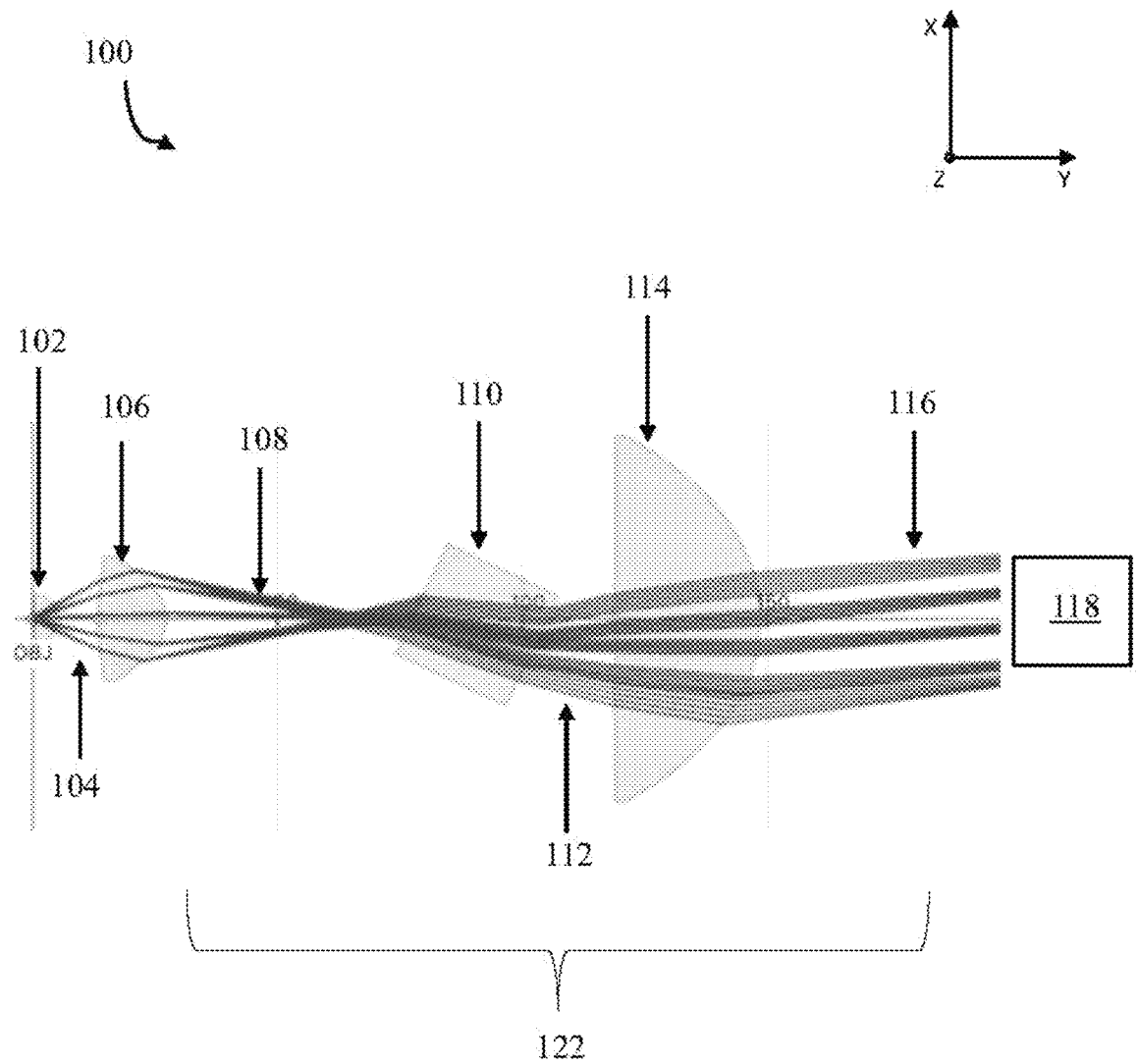

FIGS. 3A-3B, are overhead views of variously directed optical paths by illumination system 100, showing positions of optical element 110 during an illumination event in the azimuth plane, that is, the "x-y" plane. In the arrangement shown, the headlight 102, relay lens 106, the optical element 110, and front lens 114 are arranged in a substantially straight line along the azimuth plane (understanding there might be an offset of some components in other implementations).

As mentioned prior, relay lens 106 receives the light 104 from the headlight 102 to collimate, converge, or diverge the light 104, such as increase or reduce the divergence or convergence of the light 104, or align the light 104 along the "y" axis direction of the illumination system 100. As such, the relay lens 106 is positioned along the optical path 122 to direct a light beam 108 to the optical element 110. The optical element 110 directs the light 112 further to the front lens 114. The configuration of illumination system 100, with an optical path 122 straight along the azimuth plane between the headlight 102, relay lens 106, optical element 110, and front lens 114, allows for rotation of the optical element 110 to provide a large, 180 degree field of view of the environment 118.

FIG. 3A shows an exemplary position of the optical element 110 rotated along the optical element axis, "z" axis of illumination system 100, such that the optical element 110 is substantially in line with the optical path 122 (i.e., two faces 206 of the optical element 110 are parallel with the "y" axis and two faces 206 are orthogonal to the "y" axis). For explanatory purposes, this position is described as the optical element 110 being at an angle of rotation approaching 0 degrees relative the boresight of headlight 102. In some implementations, the boresight of the headlight 102 is parallel to the "y" axis of the illumination system 100. In this regard, the direction of beam 116 relative the azimuth plane is not substantially altered as the light beam 108 passes through the body of the optical element 110 and is further collimated by front lens 114, and transmitted to the environment 118.

FIG. 3B shows a second exemplary position of the optical element 110 rotated along the optical element axis, "z" axis of illumination system 100, such that the light beam 108 intersects a face 206, 210 of the optical element 110 at an angle, referred to herein as an entrance angle. FIG. 3B shows the optical element 110 rotated clockwise at an angle of rotation approaching −25 degrees with respect to the boresight of the headlight 102. This allows for the light beam 116 and headlight field of view to direct upwardly along the "x" axis of the azimuth plane, relative the boresight of headlight 102. This upward shift depends on the configuration of the front lens 114 and the configuration of the optical element 110, as the light beam 112 leaving optical element 110 passes through the front lens 114 and into the environment 118.

During an illumination event or cycle, the optical element 110 may continue to rotate clockwise around the "z" axis, from the position shown in FIG. 3B, through a progression of positions, where the optical element 110 reaches an angle of rotation approaching −45 degrees, −90 degrees, −135 degrees, −180 degrees, −225 degrees, −270 degrees, −315 degrees, −360 degrees or 0 degrees, and so on. Depending on the illumination pattern, the optical element 110 may, alternatively, rotate counter-clockwise around the "z" axis, from the position shown in FIG. 3B, back to the position shown in FIG. 3A, and through a progression of positions, where the optical element 110 reaches an angle of rotation approaching 0 degrees, 25 degrees, 45 degrees, 90 degrees, 135 degrees, 180 degrees, 225 degrees, 270 degrees, 315 degrees, 360 degrees or 0 degrees, and so on. In this regard, light beam 116 may be directed into the environment in a 180 degree field of view as light is emitted from headlight 102 is collimated, converged, or diverged by relay lens 106, refracted or translated by optical element 110, and collimated by front lens 114. Note that in other implementations, optical element 110 may oscillate or shift to a fixed position along the "z" axis to illuminate a desired area of the environment 118, rather than rotate continuously. In this regard, optical element 110 may direct the light beam 116 in any pattern along the azimuth plane such as to shift, oscillate, or otherwise direct the light beam 116 to environment 118.

Figure 4A:
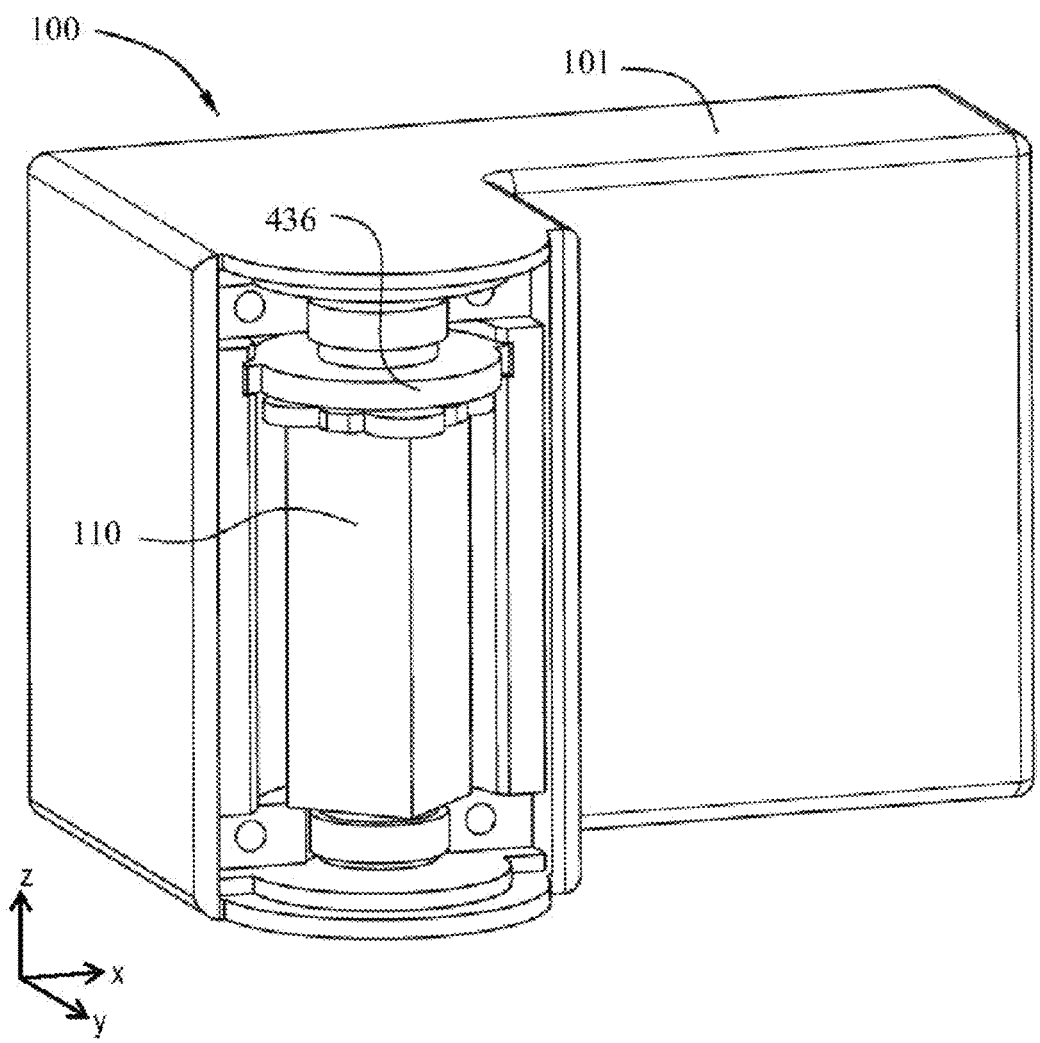
FIG. 4A-4B are front perspective views of an illumination system for a vehicle in accordance with the subject technology.
Figure 4B:
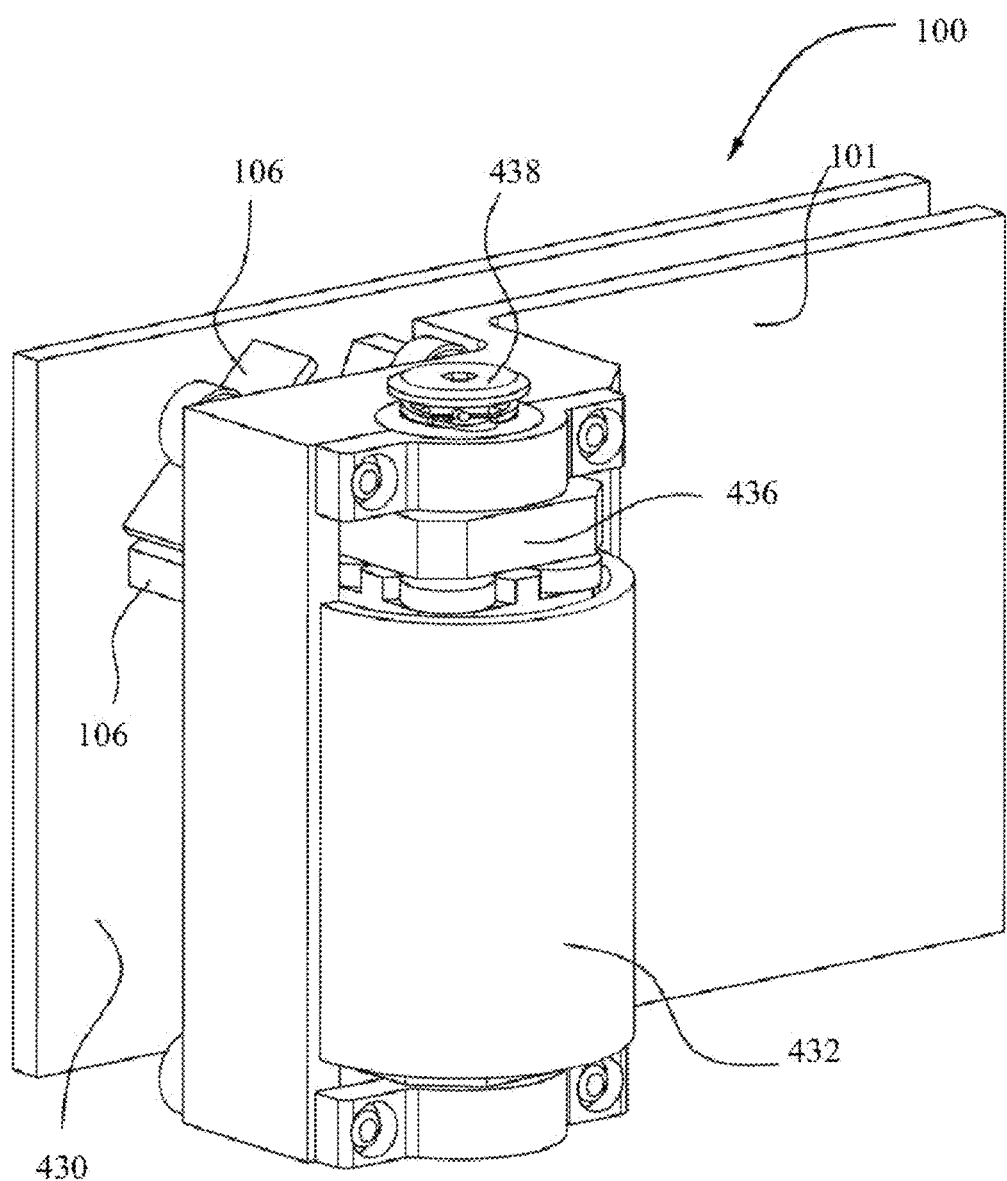

Referring now to FIGS. 4A-4B, the illumination system 100 is shown from a front perspective view, isolated from a vehicle. FIG. 4B is similar to FIG. 4A except that a printed circuit board 430 and glass housing 432 are shown in FIG. 4B and omitted from FIG. 4A for simplicity. Front lens 114 is omitted from both FIGS. 4A-4B to show other components of the system 100. The housing 101 is shown upon which the other components of illumination systems can be affixed. Note, other structural mechanisms attaching the components to the housing 101 are omitted for ease of reference. The housing 101 also serves as an outer housing, shielding internal components of the system 400. The printed circuited board 430 is located behind the housing 101 and can include circuitry or the like for carrying out the control and processing functions of the illumination system 100. A protective glass housing 432 surrounds the optical element 110, relay lens 106, and front lens 114 (not shown), and is connected to the housing 101 to form a secure covering. The protective glass housing 432 includes a transmissive face such that the protective glass housing is configured to allow light to travel therethrough. In this regard, the light travels along an optical path 110, within an interior of the spotlight housing 101, through the protective glass housing 432, and to an environment 118.

An actuator 436 may be affixed to the optical element 110 to cause it to oscillate or rotate around the vertical axis, changing the glass face 206, 210 interfacing with the emitted light beams 108 to change a direction of the optical path 122 of the illumination system 100 in the azimuth direction. The actuator 436 can be, for example, a brushless motor, a step motor, or a voice coil actuator coupled to the housing 101. The optical element 110 can then be connected to the housing 101 via coupling to a bearing or bushing 438. As the emitted light passes through the moving optical element 110, the body of the optical element 110 may refract, translate, or otherwise redirect light, partially or completely, which contacts its surface.

Referring back to FIG. 1, in other embodiments, actuator 436 may be affixed to the optical element 110 to cause it to move along the "x", "y", or "z" axis of illumination system 100 to change a direction of the optical path 122. As mentioned prior, the optical element 110 may also be rotated to a position by the actuator 436 in order to perform an illumination event of the surrounding environment 118 with the light beam 116 from the illumination system 100.

Figure 5A:
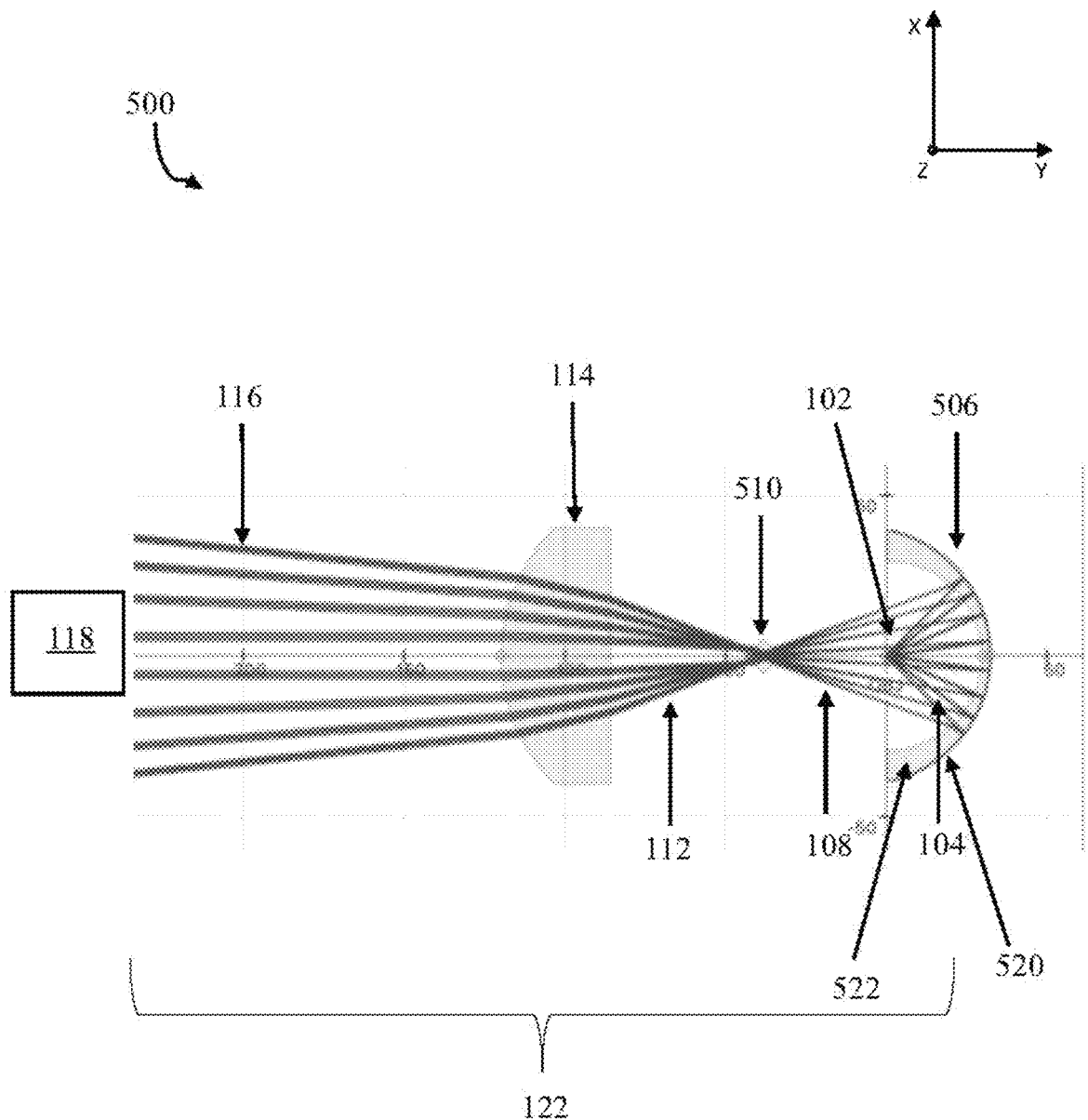
FIGS. 5A-5B are overhead schematic diagrams of an example illumination system for a vehicle in accordance with the subject technology
Figure 5B:
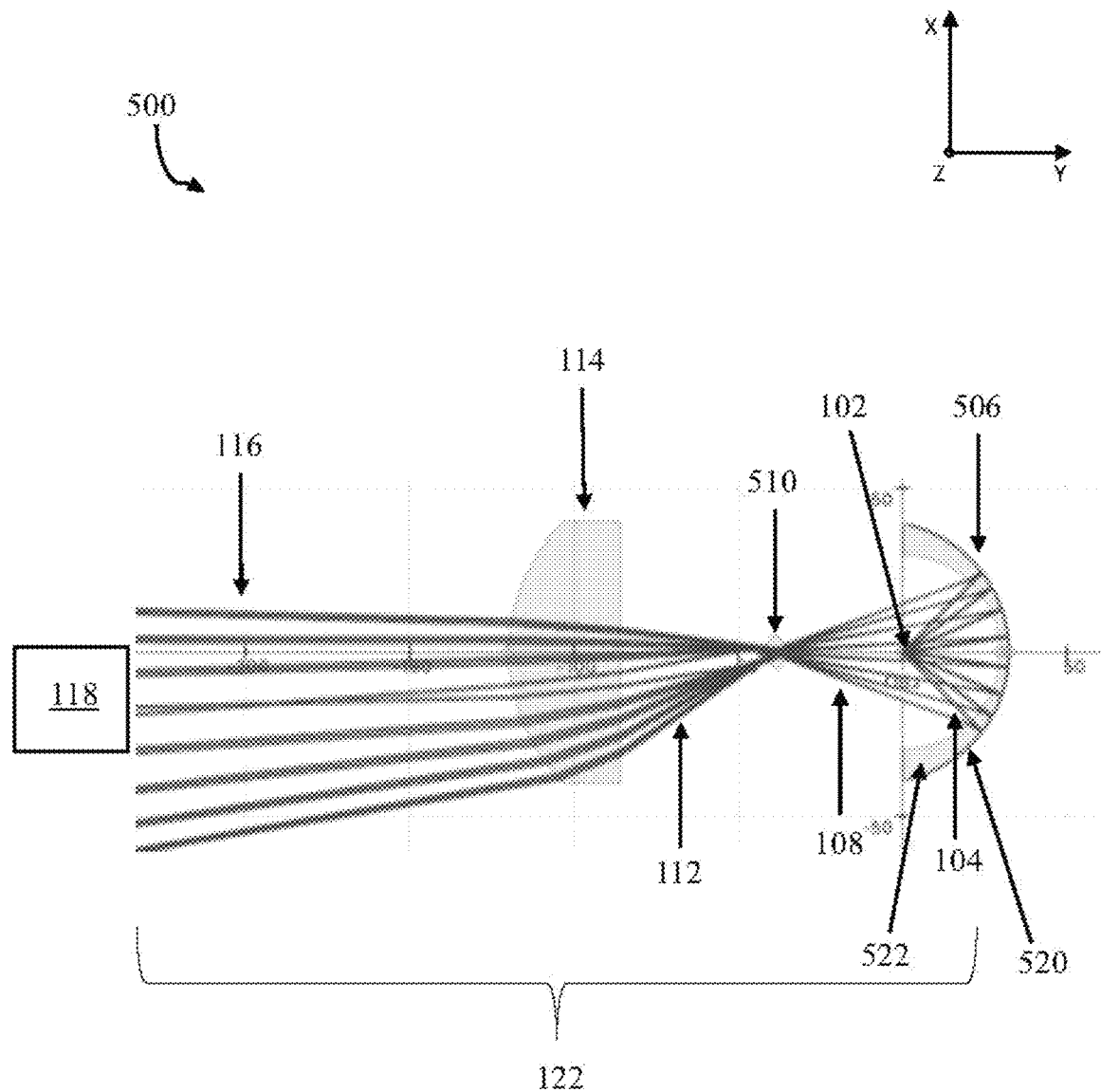

FIGS. 5A-5B, are overhead schematic views of variously directed optical paths formed by example illumination system 500 in accordance with the subject technology. The illumination system 500 is similar to the illumination system 100 except as otherwise shown and described herein. In particular, the illumination system 500 uses an alternative to relay lens 106 and another arrangement of the optical element 110 of illumination system 100.

The system 500 includes a headlight 102, compact optical element 510 (which can be mechanically similar to the optical element 110), and front lens 114 arranged in a substantially straight line in the azimuth plane, that is, the "x-y" plane (understanding there might be an offset of some components in other implementations). The compact optical element 510 mimics the design of optical element 110 as described with reference to FIGS. 1, 2A, and 2B, but may include a relatively smaller size such as to be configured to receive light at a focal plane, explained in further detail below.

Illumination system 500 may include a mirror 506 substantially in line with the other components. The mirror 506 may include a Gaussian or parabolic shape. As such, mirror 506 may be characterized by a degree of reflection which slopes radially from a center of the mirror 506. Mirror 506 may include a curved reflective portion 520 and a lens 522 seated within the interior of the curved reflective portion 522, such that mirror 506 both reflects light 104 and either collimates, converges, or diverges light 104.

In the system 500, the headlight 102 emits the light 104 in a direction opposite the position of compact optical element 510, directing light 104 to the mirror 506. For example, headlight 102 emits light 104 along a positive direction of the "y" axis of illumination system 500 where compact optical element 510 is positioned in a negative direction relative the headlight 102 position. Mirror 506 may receive the light 104 from the headlight 102 and the reflective surface 520 reflects the light 104 around the headlight 102 and to the compact optical element 510. As the light 104 passes through the lens 522, the light 104 is collimated, converged, or diverged, such that light beam 108 reflected therefrom is aligned in the direction of the "y" axis.

In one implementation the mirror 506 reflects and orients the light beam 108 reflecting therefrom in a converging manner, such that all light rays of the light beam 108 cross at a focal plane. The compact optical element 510, in this case a compact prism, may be positioned at the focal plane of the mirror 506. In this regard, the size of compact optical element 510 can be smaller in relation to the optical element 110 in illumination system 100 because the compact optical element 510 must only receive light rays 108 crossing a focal plane, rather than for example a collimated beam.

Because all rays 108 cross at the focal plane, steering of the light beam 112 is enabled by actuation of compact optical element 510.

The compact optical element 510 directs the light beam 112 further to the front lens 114. Because the configuration of illumination system 500 enables a straight optical path 122 along the azimuth plane between the headlight 102, mirror 506, compact optical element 510, and front lens 114, rotation of the compact optical element 510 enables a large, 180 degree field of view of the environment.

FIG. 5A shows an exemplary position of the compact optical element 510 rotated along the "z" axis. In illumination system 500, compact optical element 510 is positioned at a focal plane created by the mirror 506. As such, through rotation of the compact optical element 510, compact optical element 510 can advantageously steer and further reflect the light beam 112 in a desired direction. For explanatory purposes, it is described that the compact optical element 510 is at an angle of rotation approaching 45 degrees relative the "z" axis of illumination system 500, such that light beam 108 interfaces with an edge of the compact optical element 510. In this regard, the direction of beam 116 relative the azimuth plane is not substantially altered, as the light beam 108 passes through the faces 206, 210 of the compact optical element 510, is further collimated by front lens 114, and into the environment 118.

FIG. 5B shows a second example position of the compact optical element 510 rotated along the "z" axis. In illumination system 500 compact optical element 510 is positioned at a focal plane created by the mirror 506. As such, through rotation of the compact optical element 510, compact optical element 510 can advantageously steer and further reflect the light beam 112 in a desired direction. FIG. 5B shows the compact optical element 510 rotated approximately 60 degrees, counter-clockwise, relative the "z" axis of illumination system 500, such that light beam 108 interfaces at least partially with a face 206, 210 of the compact optical element 510. This allows for the headlight 102 field of view to change in a downwardly direction within the environment 118, relative the "x" axis of illumination system 500. This downward shift depends on the configuration of the front lens 114 and the configuration of the compact optical element 510, as the light beam 112 leaving compact optical element 510 reflects from the front lens 114 and into the environment 118.

Figure 6:
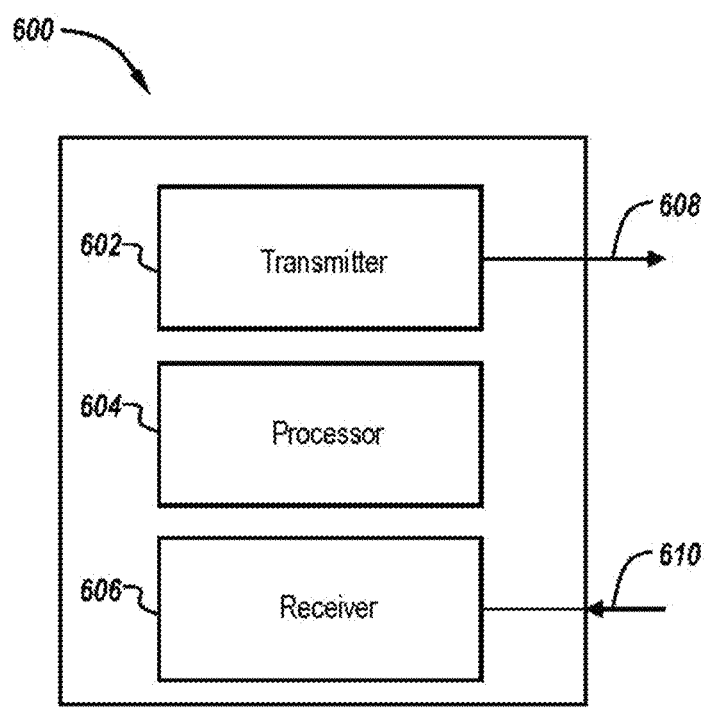
FIG. 6 is a block diagram of an exemplary detection system that, in some implementations, is used in conjunction with the illumination system in accordance with the subject technology.

FIG. 6 is a block diagram of an exemplary detection system 600 that, in some implementations, is used in conjunction with illumination system described herein. Detection system 600 can include multiple sensing modules such as LiDAR, LADAR, radar, camera, radio, GPS, GNSS, map, and other like detection modules. In this regard, detection system 600 may regularly scan the environment for data concerning the environment such as: surface impediments; hazardous or nonhazardous articles thereon; curves or turns in the traveling surface; or markers such as crosswalks or lane dividing lines. The environment 118 may include other articles such as vehicles or signs, and retroreflective surfaces thereon such as a license plate, light modules, or traffic signs. The environment 118 may include other objects or characteristics.

In an exemplary implementation, system 600 includes a laser transmitter 602, a processor 604, and a receiver 606. Laser transmitter 602 is configured to emit laser pulses 608 and/or wavelength-converted pulses 608 while receiver 606 is configured to receive reflected and/or returned laser pulses 610 scattered from a target object and/or terrain. Processor 604 may perform functions such as, without limitation, streaming cross-correlations, artifact corrections, target acquisitions, and tracking and discrimination of targets. Processor 604 may generate image data and/or information for other systems such as an illumination system described herein, or an automatic target recognizer system. Processor 604 may communicate with a processing module 120 on illumination systems described herein to actuate the optical element 110 to direct the optical path 122 to the environment 118.

In this regard, illumination systems described herein can selectively adapt illumination of a headlight to the road geometry, such as compensating for misalignment of a headlight system. Illumination systems described herein can provide: one optic with a high beam illumination pattern or a low beam illumination pattern; NIR illumination; compatibility with large front lens, large laser beams within the illumination system, providing efficient detection light collection; and allows for 4 azimuth sweeps for every rotation of the optical element, hence, reducing the required rotation speed.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. processors, circuitry, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. An illumination system for a vehicle comprising:
   a vehicle headlight configured to emit a light beam along an optical path and into an environment;
   an optical element having a body comprising four sides, the optical element positioned along the optical path and configured to redirect the light beam;
   a front lens positioned along the optical path and configured to receive the light beam from the optical element and collimate the light beam as the light beam passes into the environment; and
   a curved mirror positioned along the optical path, the curved mirror including:
      an inner reflective surface configured to reflect the light beam from the vehicle headlight and towards the optical element; and
      a lens positioned along the inner reflective surface to converge the light beam to a focal plane,
   wherein the optical element is configured to move around an optical element axis to change a direction the light beam is transmitted relative to an azimuth plane of the environment.

2. The illumination system of claim 1, wherein a rotational position of the optical element around the optical element axis and a position of the front lens along the optical path determines a direction of the light beam in the azimuth plane.

3. The illumination system of claim 1, further comprising a relay lens positioned along the optical path between the vehicle headlight and the optical element, the relay lens configured to receive the light beam from the headlight and collimate the light beam.

4. The illumination system of claim 1, further comprising a detection system to determine attributes of the environment.

5. The illumination system of claim 1, wherein the vehicle headlight includes a high irradiance white light source.

6. The illumination system of claim 1, wherein the vehicle headlight has an emitting area of less than 0.5 square millimeters.

7. A vehicle headlight comprising:
   a vehicle headlight housing having a transmissive side;
   a light source positioned within the vehicle headlight housing, the light source configured to emit a light beam along an optical path and into an environment;
   an optical element positioned within the vehicle headlight housing between the light source and the transmissive side, the optical element positioned along the optical path, the optical element having a body comprising four sides; and
   a front lens positioned within the vehicle headlight housing between the optical element and the transmissive side, the front lens positioned along the optical path, the front lens configured to receive the light beam from the optical element and collimate the light beam as the light beam passes through the transmissive side of the vehicle headlight housing and into an environment; and
   a curved mirror positioned along the optical path, the curved mirror including:
      an inner reflective surface configured to reflect the light beam from the headlight and towards the optical element; and
      a lens positioned along the inner reflective surface to converge the light beam to a focal plane,
   wherein the optical element is configured to move around an optical element axis to change a direction the light beam is transmitted relative to an azimuth plane of the environment.

8. The vehicle headlight of claim 7, wherein a rotational position of the optical element around the optical element axis and a position of the front lens along the optical path determines a direction of the light beam in the azimuth plane.

9. The vehicle headlight of claim 7, further comprising a relay lens positioned along the optical path between the light source and the optical element, the relay lens configured to receive the light beam from the light source and collimate the light beam.

10. The vehicle headlight of claim 7, further comprising a detection system to determine attributes of the environment.

11. The vehicle headlight of claim 7, wherein the light source includes a high irradiance white light source.

12. A method of illuminating an environment with an illumination system on a vehicle comprising:
   emitting light, with a vehicle headlight of the illumination system, along an optical path and into an environment;
   converging the light, before receiving the light with the optical element, with a curved mirror positioned along the optical path, the curved mirror including:
      an inner reflective surface configured to reflect the light beam from the vehicle headlight and towards the optical element; and
      a lens positioned along the inner reflective surface to converge the light beam to a focal plane;
   receiving the light with an optical element, the optical element having a body comprising four sides;
   actuating the optical element around an optical element axis to change a direction a light beam is transmitted from the optical element relative to an azimuth plane of the environment; and
   collimating, with a front lens of the illumination system, the light from the optical element.

13. The method of claim 12, wherein a rotational position of the optical element around the optical element axis and a position of the front lens along the optical path determines a direction of the light beam in the azimuth plane.

14. The method of claim 12, further comprising collimating the light with a relay lens before receiving the light with the optical element.

15. The method of claim 12, wherein the vehicle headlight includes a high irradiance white light source.

16. The method of claim 12, wherein the vehicle headlight has an emitting area of less than 0.5 square millimeters.

17. The vehicle headlight of claim 7, wherein the light source has an emitting area of less than 0.5 square millimeters.

* * * * *